United States Patent [19]

Koma et al.

[11] Patent Number: 5,708,958
[45] Date of Patent: Jan. 13, 1998

[54] METHOD OF SEPARATING TRIVALENT ACTINIDES AND RARE EARTH ELEMENTS

[75] Inventors: Yoshikazu Koma; Masayuki Watanabe; Shinichi Nemoto, all of Naka-gun, Japan

[73] Assignee: Doryokuro Kakunenryo Kaihatsu Jigyodan, Tokyo, Japan

[21] Appl. No.: 695,570

[22] Filed: Aug. 12, 1996

[30] Foreign Application Priority Data

Sep. 12, 1995 [JP] Japan ................................ 7-233889

[51] Int. Cl.$^6$ ................................................ B01D 11/04
[52] U.S. Cl. ........................... 423/8; 423/10; 423/21.5
[58] Field of Search ............................. 423/8, 10, 21.1, 423/21.5

[56] References Cited

U.S. PATENT DOCUMENTS

| 3,230,036 | 1/1966 | Kappelmann et al. |
| 3,294,494 | 12/1966 | Moore. |
| 4,574,072 | 3/1986 | Horwitz et al. ................ 423/9 |
| 4,938,871 | 7/1990 | Musikas et al. ................ 210/634 |

FOREIGN PATENT DOCUMENTS

| 0-043-765-A1 | 1/1982 | France. |
| 0-110-789-A1 | 6/1984 | France. |
| 1-552-956 | 9/1979 | United Kingdom. |

OTHER PUBLICATIONS

Kasting, G.B., et al., Separation of Trivalent Actinides From Lanthanides by Solvent Extraction, J. inorg., Nucl. Chem. vol. 41, pp. 745–747, 1979.

*Primary Examiner*—Ngoclan Mai
*Attorney, Agent, or Firm*—Oliff & Berridge, P.L.C.

[57] ABSTRACT

A method is provided for separating trivalent actinides and rare earth elements in the TRUEX method using a CMPO-TBP mixed solvent. The method of separating trivalent actinides and rare earth elements comprises a trivalent actinide/rare earth extraction step wherein trivalent actinides and rare earth elements are extracted by a solvent from highly acid waste generated by reprocessing of spent nuclear fuel, a nitric acid removal step wherein the nitric acid concentration of the solvent used to extract the trivalent actinides and rare earth elements is reduced, and a separation step wherein the trivalent actinides and rare earth elements contained in the solvent of low nitric acid concentration, are separated from each other.

11 Claims, 6 Drawing Sheets

SALTING AGENT DEPENDENCE OF DISTRIBUTION
RATIO OF TRIVALENT ACTINIDES IN STRIPPING USING
0.05MDTPA-xMNaNO$_3$ SOLUTION (pH=2.0)

Fig. 3 pH DEPENDENCE OF DISTRIBUTION RATIO
OF TRIVALENT ACTINIDES IN STRIPPING USING
0.05MDTPA-xMNaNO$_3$ SOLUTION

Fig. 4

DTPA CONCENTRATION DEPENDENCE OF DISTRIBUTION
RATIO OF TRIVALENT ACTINIDES IN STRIPPING USING
0.05MDTPA-xMNaNO$_3$ SOLUTION (pH=2.0)

Fig. 5

DEPENDENCE OF Am AND NITRIC ACID DISTRIBUTION RATIOS ON SODIUM NITRATE CONCENTRATION

Fig. 6

METHOD OF SEPARATING TRIVALENT ACTINIDES AND RARE EARTH ELEMENTS

FIELD OF THE INVENTION

This invention relates to a method of separating trivalent actinides and rare earth elements, and in particular, to the separation of trivalent actinides and rare earth elements from highly acidic liquid waste produced by reprocessing of spent nuclear fuel, and to a separation method which allows easy process control.

BACKGROUND OF THE INVENTION

Highly radioactive waste generated from reprocessing of spent nuclear fuel contains various elements which retain their toxicity over long periods of time, such as transuranium elements (TRU), and the treatment and disposal of these elements presents a problem. Of the transuranium elements, the trivalent actinides americium (Am) and curium (Cm) have especially high toxicity, so it is desirable to remove them from radioactive waste and to deal with them appropriately. When using Am and Cm as fuel, Am, Cm and rare earth elements which chemically resemble each other, have to be separated.

One method of separating transuranium elements including trivalent actinides such as Am or Cm and nuclear fission products (FP) from highly radioactive waste, is the TRUEX method. In the TRUEX method, octyl (phenyl)-N,N-di-isobutylcarbamoylmethylphosphine oxide (referred to hereafter as CMPO) and tributylphosphoric acid (referred to hereafter as TBP) are mixed with a hydrocarbon diluent (e.g. n-dodecane) to make a solvent with which transuranium elements are extracted. This solvent will be referred to hereafter as a CMPO-TBP mixed solvent. The CMPO-TBP solvent is brought into contact with acidic radioactive waste to separate transuranium elements and nuclear fission products. According to the TRUEX method, transuranium elements including trivalent actinides such as Am and Cm are extracted by the CMPO-TBP mixed solvent, leaving nuclear fission products in the aqueous phase.

However, rare earth elements in the nuclear fission products are also extracted together with transuranium elements by the CMPO-TBP solvent. Consequently, the method could not be used to separate trivalent actinides such as Am and Cm in the transuranium elements from rare earth elements.

Various solvent extraction methods have been developed and proposed to date to separate trivalent actinides and rare earth elements from each other. Typical examples are a method using TBP, a neutral organophosphorus extracting agent, and the TALSPEAK method which was developed in the 1960's.

A problem of the method using undiluted TBP was that trivalent actinides are separated from rare earth elements using nitric acid solution of greater than 10M concentration, and separation procedures therefore had to be conducted at very high acid concentrations. There was also a problem in that, despite these severe conditions, the distribution ratio of trivalent actinides and rare earth elements was small, and the separation factor of each element was low.

In the TALSPEAK method, trivalent actinides and rare earth elements are separated using an acidic organophosphorus reagent (HDEHP, di-2-ethylhexyl-phosphoric acid) and an aminopolyacetic type complexing agent (e.g. diethylenetriamine pentacetic acid). According to this TALSPEAK method, trivalent actinides and rare earth elements can be separated from each other with high efficiency.

However, according to the aforesaid TALSPEAK method, a pH of approximately 3 must be maintained in the separating step in order to obtain suitable separation conditions.

The highly radioactive waste generated by reprocessing of spent nuclear fuel normally contains acid of approximately 3M concentration. It was therefore necessary to subject the highly acid waste to a denitrification step as a pretreatment to reduce its acidity before using the TALSPEAK method. It was also necessary to maintain the pH at 3 throughout the entire separation process, and normally, the pH had to be controlled by adding pH buffers such as highly concentrated carboxylic acids (e.g. lactic acid) to the stripping solution. It was difficult to adjust the pH precisely.

Further, when processing is performed to remove buffers contained in trivalent actinide products separated by the TALSPEAK method, concentrated nitric acid solution of approximately 1M concentration is obtained, but this is undesirable from the viewpoint of product application.

SUMMARY OF THE INVENTION

This invention, which was conceived in view of the aforesaid problem, therefore aims to provide a method of separating trivalent actinides and rare earth elements from each other in the TRUEX method employing a CMPO-TBP mixed solvent.

To resolve the aforesaid problems, the method of separating trivalent actinides and rare earth elements according to this invention comprises a trivalent actinide/rare earth extraction step for extracting actinides and rare earth elements from highly acid waste generated by reprocessing of spent nuclear fuel, this extraction being performed by use of a solvent, a nitric acid removal step for reducing the nitric acid concentration of the solvent which is extracting the trivalent actinides and rare earth elements, and a separation step for separating the trivalent actinides and rare earth elements contained in the solvent of low nitric acid concentration, from each other.

In the trivalent actinide/rare earth element extraction step, trivalent actinides and rare earth elements are extracted by a highly acidic solvent. In the rare earth element/trivalent actinide separation step, on the other hand, the rare earth elements and trivalent actinides cannot be separated and extracted unless the pH is less than a predetermined value, e.g. 1.5–3.

According to this invention, therefore, the separation of rare earth elements and trivalent actinides is made possible by providing a nitric acid removal step between the trivalent actinide/rare earth element extraction step and rare earth element/trivalent actinide separation step, thereby removing a predetermined amount of nitric acid from the solution obtained in the trivalent actinide/rare earth extraction step so as to adjust the acid concentration to a suitable level. In this way, a good separation of trivalent actinides and rare earth elements is achieved.

DESCRIPTION OF THE PRESENT INVENTION

Figure 1:
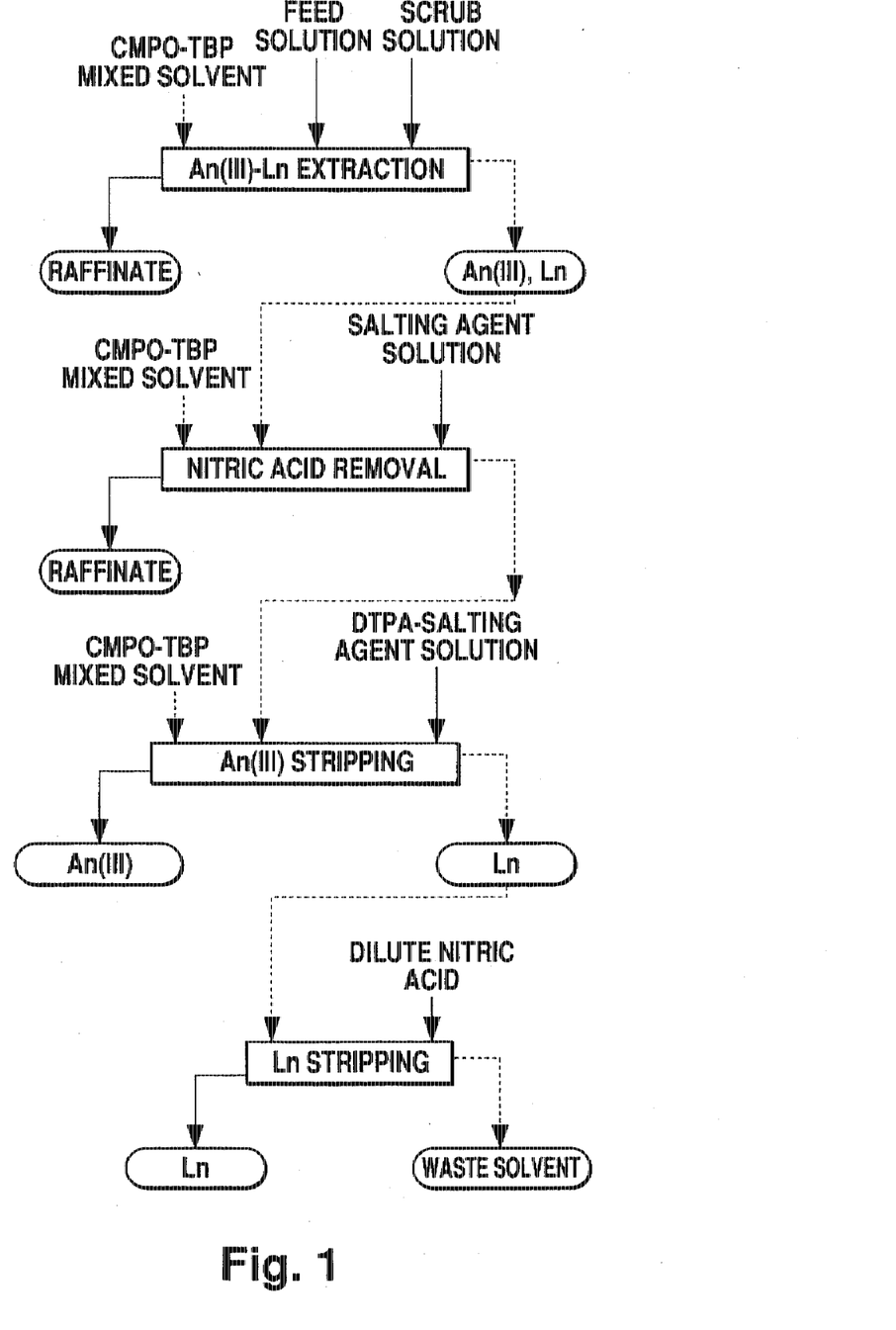
FIG. 1 is a conceptual flowchart of the method of separating trivalent actinides and rare earth elements according to this invention.

A preferred form of the present invention will now be described with reference to the conceptual flowchart of the method of separating trivalent actinides and rare earth elements shown in FIG. 1. Ln is a rare earth element and An(III) is a trivalent actinide.

To resolve the aforesaid problems, the method of separating trivalent actinides and rare earth elements according to this invention comprises a trivalent actinide/rare earth extraction step for extracting actinides and rare earth elements from highly acid waste generated by reprocessing of spent nuclear fuel, this extraction being performed by use of a solvent, a nitric acid removal step for reducing the nitric acid concentration of the solvent which is extracting the trivalent actinides and rare earth elements, and a separation step for separating the trivalent actinides and rare earth elements contained in the solvent of low nitric acid concentration, from each other.

In the trivalent actinide/rare earth element extraction step, trivalent actinides and rare earth elements are extracted by a highly acidic solvent. In the rare earth element/trivalent actinide separation step, on the other hand, the rare earth elements and trivalent actinides cannot be separated and extracted unless the pH is less than a predetermined value, e.g. 1.5–3.

The method of separating rare earth elements and trivalent actinides according to this invention comprises a trivalent actinide/rare earth extraction step for extracting actinides and rare earth elements from highly acid waste generated by reprocessing of spent nuclear fuel, this extraction being performed by use of a solvent, a nitric acid removal step for reducing the nitric acid concentration of the solvent used to extract the trivalent actinides and rare earth elements, and a separation step for separating the trivalent actinides and rare earth elements contained in the solvent of low nitric acid concentration, from each other.

Examples of trivalent actinides obtained by the separation method of this invention are Am (americium), curium (Cm), berkelium (Bk) and californium (Cf).

Examples of rare earth elements obtained by the separation method of this invention are Y (yttrium) and the lanthanides from La (lanthanum), Ce (cerium) and Nd (neodymium) to Lu (lutetium), but particular Y, and the lanthanides from La to Gd (gadolinium).

The method of separating trivalent actinides and rare earth elements according to this invention may be applied to any waste generated by reprocessing of spent nuclear fuel. However, when uranium (U) and plutonium (Pu) are present in high level radioactive waste above a certain concentration, they may interfere with the solvent extraction step using CMPO-TBP mixed solvent. It is therefore advisable to eliminate U and Pu by the PUREX method before extracting trivalent actinides and rare earths by the method of this invention.

Trivalent Actinide and Rare Earth Extraction Step

In this step, trivalent actinides and rare earth elements are extracted from the aforesaid highly radioactive waste by a CMPO-TBP mixed solvent using the TRUEX method.

Trivalent actinides and rare earth elements are extracted by bringing this mixed solvent preferably comprising CMPO, octyl(phenyl)-N,N-di-isobutylcarbamoylmethylphosphine oxide of 0.2M concentration, tributylphosphoric acid of 1.0–1.4M concentration and a hydrocarbon diluent, in contact with the radioactive waste.

The hydrocarbon diluent may be n-dodecane, which is a straight chain aliphatic hydrocarbon, or NPH, which is a mixture of aliphatic hydrocarbons with different numbers of carbon atoms.

When the CMPO concentration is less than 0.2M, the trivalent actinide extraction capacity declines. When the CMPO is greater than 0.2M, the organic phase tends to separate into two phases when metals of a certain concentration are extracted. When the TBP concentration is less than 1.0M, the organic phase tends to separate into two phases when metals of a certain concentration are extracted, on the other hand when the TBP concentration is greater than 1.4M, the specific gravity of the organic phase increases undesirably.

Nitric Acid Removal Step

In this step an aqueous solution of nitric acid containing 0.2–1.0M of a nitrate which is a salting agent, and adjusted to pH 2–3, is brought into contact with the CMPO-TBP mixed solvent when the solvent still contained the trivalent actinides and rare earth elements extracted in the aforesaid extraction step. This strips only the nitric acid from the CMPO-TBP mixed solvent, and adjusts the acid concentration in the solvent to 0.01M or less.

The nitrate may for example be a metal nitrate such as an alkali metal nitrate or alkaline earth metal nitrate, or hydroxylammonium nitrate. Preferred alkali metals of alkali metal nitrates are lithium (Li), sodium (Na) and potassium (K). Preferred alkaline earth metals of alkaline earth metal nitrates are magnesium (Mg) and calcium (Ca).

Rare Earth Metal Element and Trivalent Actinide Separation Step

In this step, CMPO-TBP mixed solvent containing trivalent actinides and rare earth elements in which the acid concentration has been reduced to 0.01M or less, is brought into contact with an aqueous solution comprising a nitrate salt of 1–5M concentration and a complexing agent of 0.01–0.1M concentration. This strips trivalent actinides into the aqueous phase from the CMPO-TBP mixed solvent, thereby separating them from rare earth elements. It is preferable if the pH in the separation step is adjusted to within the range 1.8–2.2.

When the nitrate salt concentration in the aforesaid aqueous solution is less than 1M, the distribution ratio of rare earth elements cannot be maintained sufficiently high. Conversely, when the nitrate salt concentration exceeds 5M, the distribution ratio of trivalent actinides is too high. When the concentration of complexing agent is less than 0.01M, the distribution ratio of trivalent actinides is too high, and when the concentration of complexing agent exceeds 0.1M, the distribution ratio of rare earth elements cannot be maintained sufficiently high. Further, when the acid concentration in the CMPO-TBP mixed solvent exceeds 0.01M, there is a risk that the pH in the process may be lowered.

A high distribution ratio refers to the fact that the concentration of a chemical species in the organic phase is higher than its concentration in the aqueous phase, conversely a low distribution ratio refers to the fact that its concentration in the aqueous phase is higher than in the organic phase.

The aforementioned nitrate may be an alkali metal salt or a hydroxylammonium salt. Preferred examples of nitrates are alkali metal nitrates or hydroxylammonium nitrate, lithium (Li), sodium (Na) and potassium (K) being particularly preferred as the alkali metal.

Examples of complexing agents are aminopolyacetic acids such as diethylenetriamine pentacetic acid (DTPA), ethylenediamine tetracetic acid (EDTA) and nitrilotriacetic acid (NTA).

The temperature in this step is preferably from room temperature to approximately 40° C. It is undesirable to perform the operation at high temperature, as it lowers the distribution ratio.

The time for which the aqueous solution containing the complexing agent and salting agent is brought in contact with the solvent used to extract the metals, is preferably at least 5 minutes, and the retention time in the countercurrent multistage process is preferably set to this level.

Stripping of Rare Earth Elements

In this step, rare earth elements are stripped using dilute nitric acid from the CMPO-TBP mixed solvent containing rare earth elements which were separated from trivalent actinides in the preceding step. The solvent from which rare earth elements have been stripped, after removing residual elements, is recycled as used solvent to the solvent treatment system.

DESCRIPTION OF THE ACTUAL EXAMPLES

Figure 2:
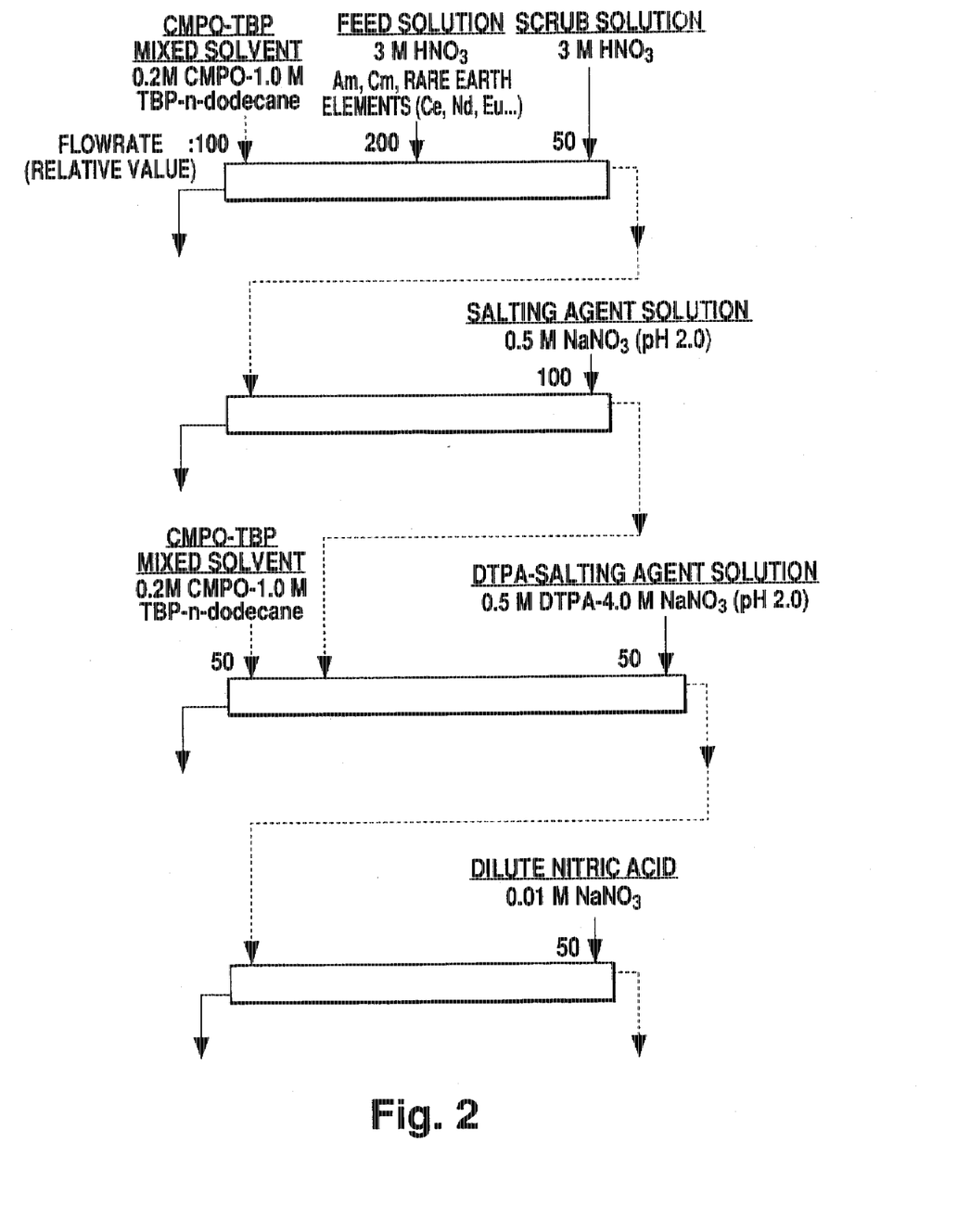
FIG. 2 is a process diagram of a typical experiment wherein trivalent actinides are separated from rare earth elements by a countercurrent multistage method according to this invention.

Next, this invention will be described more specifically with reference to typical experiments.
(1) Liquid waste as feed solution
The solution obtained by taking a raffinate generated by applying the PUREX method to fuel irradiated in a "Joyo" fast experimental reactor, and then treating it by the TRUEX method, was used. This solution contained the trivalent actinides Am and Cm, and the rare earth elements Y, La, Ce, Pr, Nd, Pm, Sm and Eu.
(2) Method
FIG. 2 is a flowchart of a typical experiment performed by applying the countercurrent multistage method to the separation of trivalent actinides and rare earth elements according to this invention.

First Step: Trivalent Actinide/Rare Earth Element Separation

CMPO-TBP solvent comprising 0.2M CMPO, 1.0M TBP and n-dodecane was circulated at a relative flowrate of 100, then 3M $HNO_3$ and the aforesaid waste to be treated were countercirculated at relative flowrates of 50 and 200 respectively. Trivalent actinides and rare earth elements were extracted by the mixed solvent, and it was confirmed by radioactivity analysis that there were no trivalent actinides and rare earth elements in the aqueous phase.

Second Step: Nitric Acid Removal

The aforesaid CMPO-TBP solvent containing the trivalent actinides and rare earth elements was circulated at a relative flowrate of 100, and a 0.01M nitric acid solution containing 0.5M sodium nitrate was countercirculated at a relative flowrate of 100. The acid concentration of the solvent discharged from this step was less than 0.01M. This solvent was transported to the next step by a pump, and the aqueous phase was discarded.

Third Step: Separation of Rare Earth Elements and Trivalent Actinides

The CMPO-TBP solvent treated in the preceding step was circulated at a relative flowrate of 100, a solvent of identical composition (CMPO-TBP solvent comprising 0.2M CMPO, 1.0M TBP and n-dodecane) washed by dilute nitric acid was circulated at a relative flowrate of 50, and an aqueous solution comprising 4M sodium nitrate and 0.05M diethylenetriamine pentacetic acid (DTPA) was countercirculated at a relative flowrate of 50. The extent of the separation was evaluated by radioactive and elemental analysis. The CMPO-TBP mixed solvent phase was transported to the next step.

Fourth Step: Stripping of Rare Earth Elements

The CMPO-TBP mixed solvent treated in the preceding step was countercirculated in contact with a 0.01M aqueous solution of nitric acid circulated at a relative flowrate of 50 to extract rare earth elements into the aqueous phase.
(3) Results
The results were evaluated by a decontamination factor and removal ratio shown below.
a) Decontamination factor for trivalent actinides
The decontamination factor for trivalent actinides was found from the following equation.

$$\text{Decontamination factor} = \frac{(Ln \text{ conc. before separation})/(An(\text{III}) \text{ conc. before separation})}{(Ln \text{ conc. after separation})/(An(\text{III}) \text{ conc. after separation})}$$

(Equation 1)

where Ln denotes rare earth elements and An(III) are trivalent actinides.

Rare earth elements and trivalent actinides are determined by radioactivity or elemental analysis. In the case of radioactivity analysis the decontamination factor is calculated from the radioactive isotope concentration, whereas in the case of elemental analysis, it is calculated from the element concentration.

b) Rate of removal of rare earth elements from trivalent actinides

The removal ratio was expressed as a percentage representing the concentration ratio, after separation, of rare earth elements in the CMPO-TBP mixed solvent, which contains both trivalent actinides and rare earth elements, to the concentration of rare earth elements in the aqueous phase. As it is ideal if only trivalent actinides are present in the aqueous phase after separation, a higher removal ratio indicates a better separation. The removal ratio may also be found from the radioactivity concentration.

TABLE 1

| Decontamination factor for Am | | |
|---|---|---|
| La | > | 1000 |
| Ce | | 200 |
| Pr | | 50 |
| Nd | | 20 |
| Sm | | 5 |
| Eu | | 1.5 |

The decontamination factor of 200 for Ce, for example, means that the concentration of Ce relative to Am fell to 1/200 of their concentration ratio in the treated solution due to the separation of trivalent actinides and rare earth elements. The decontamination factors of rare earth elements relative to Cm were effectively the same as in the case of Am.

Light rare earth elements from La to Nd normally account for 80% of rare earth in radioactive waste, and it was demonstrated that the separation between trivalent actinides and rare earth elements was satisfactory.

Next, Table 2 shows the removal ratio of rare earth elements in trivalent actinide products obtained in the third separation step.

TABLE 2

| Rare earth element | Removal ratio (%) |
|---|---|
| La | ~100 |
| Ce | ~100 |
| Nd | 80 |
| Pr | 80 |
| Sm | 50 |

The above results show that a good separation between trivalent actinides and rare earth elements is achieved according to the trivalent actinide/rare earth element separation method of this invention.

The aforesaid results were obtained by the countercurrent multistage technique. The results shown below were obtained when each step was performed by a batch technique.

Figure 6:
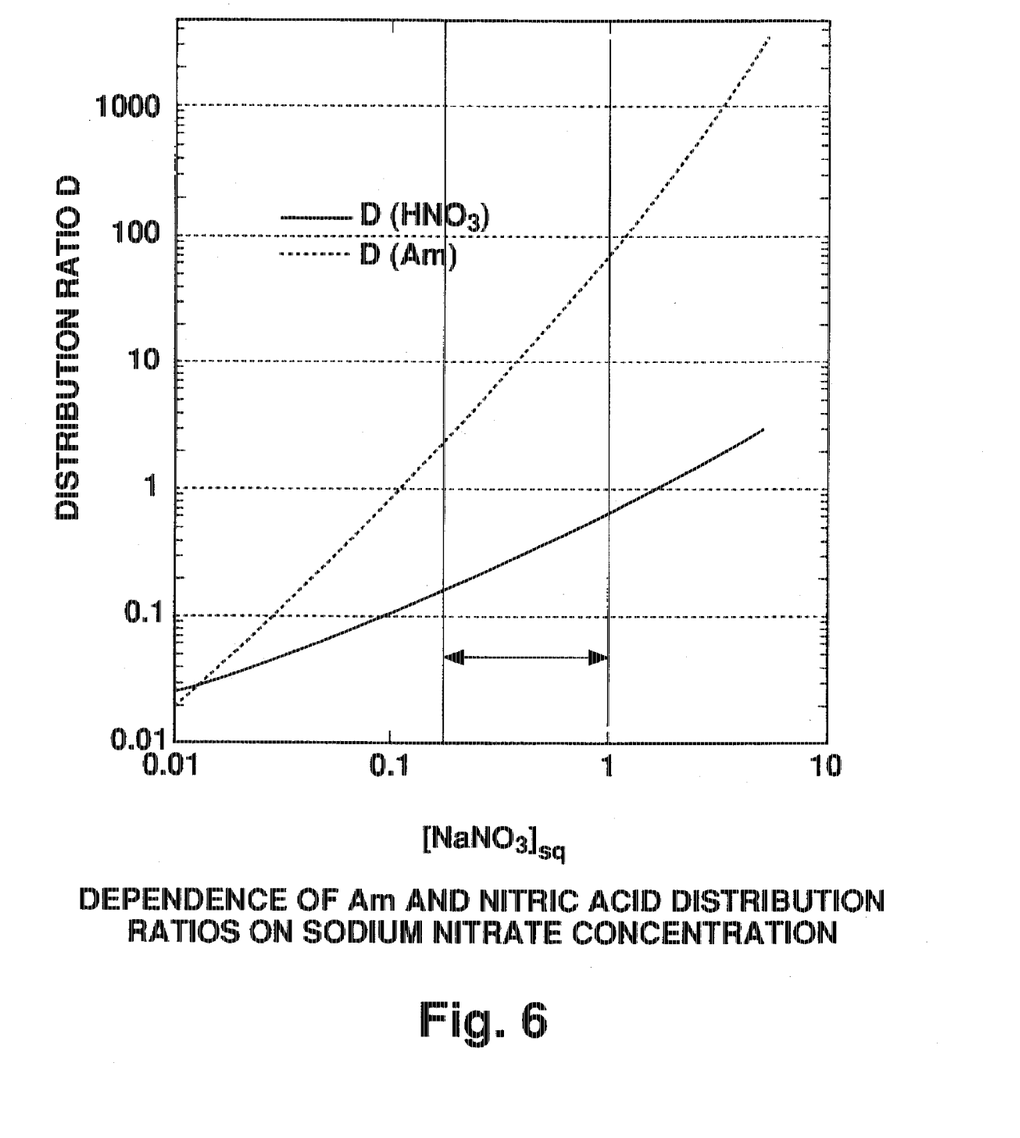
FIG. 6 is a diagram showing the distribution ratio of Am in selective stripping of nitric acid in a second step.

FIG. 6 shows the distribution ratio of Am in selective stripping of nitric acid in the second step. When a nitrate solution containing a sodium nitrate concentration within the range shown by the arrows in FIG. 6 wherein the distribution ratio of Am is 1 or more and the distribution ratio of nitric acid is 1 or less, is brought to contact with the CMPO-TBP solvent, the nitric acid in the CMPO-TBP solvent is selectively stripped into the aqueous phase while Am, a trivalent actinide remains in the CMPO-TBP solvent.

Figure 3:
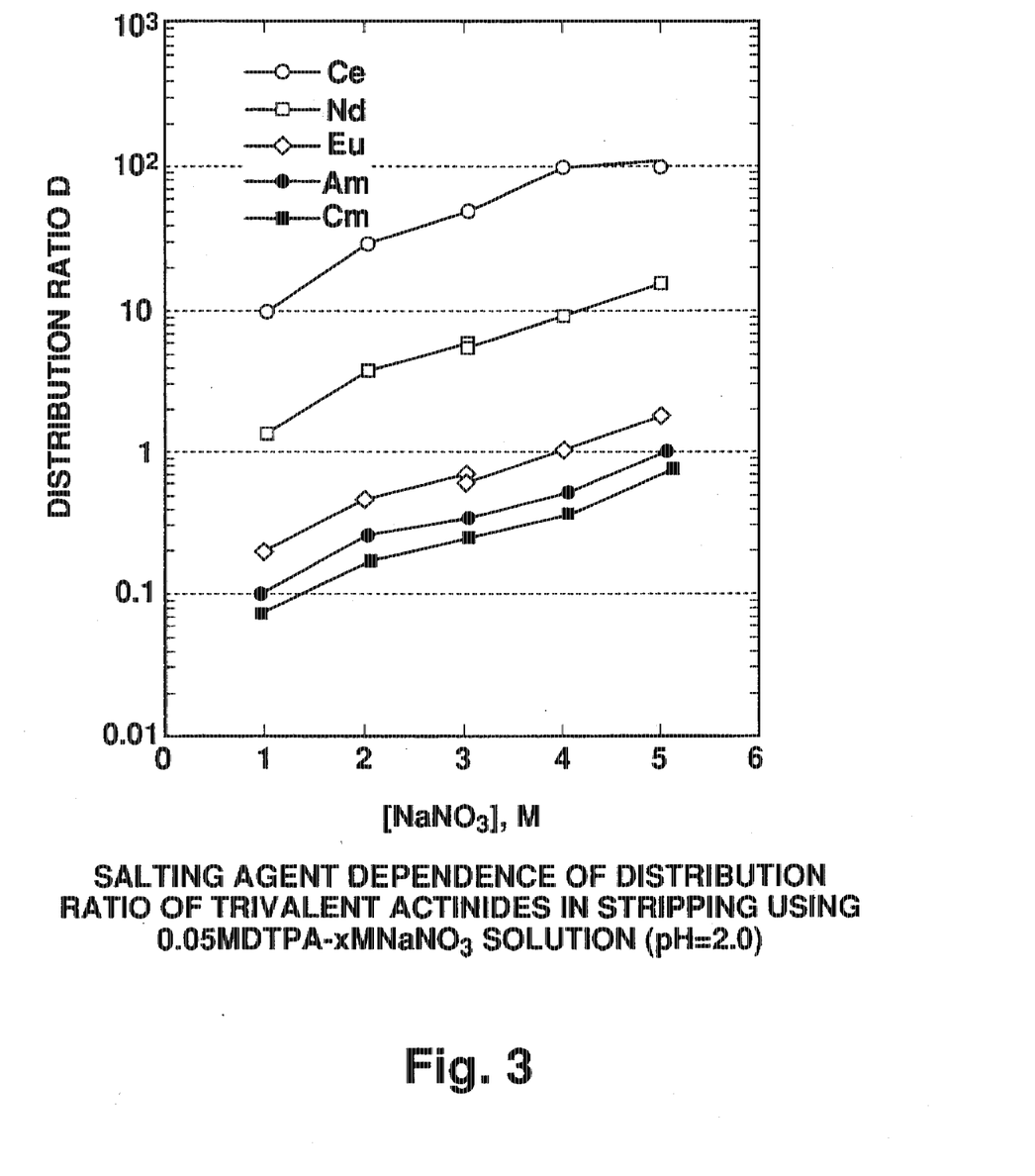
FIG. 3 is a diagram showing sodium nitrate concentration dependence of the distribution ratio of trivalent actinides and rare earth elements in stripping of trivalent actinides.
Figure 4:
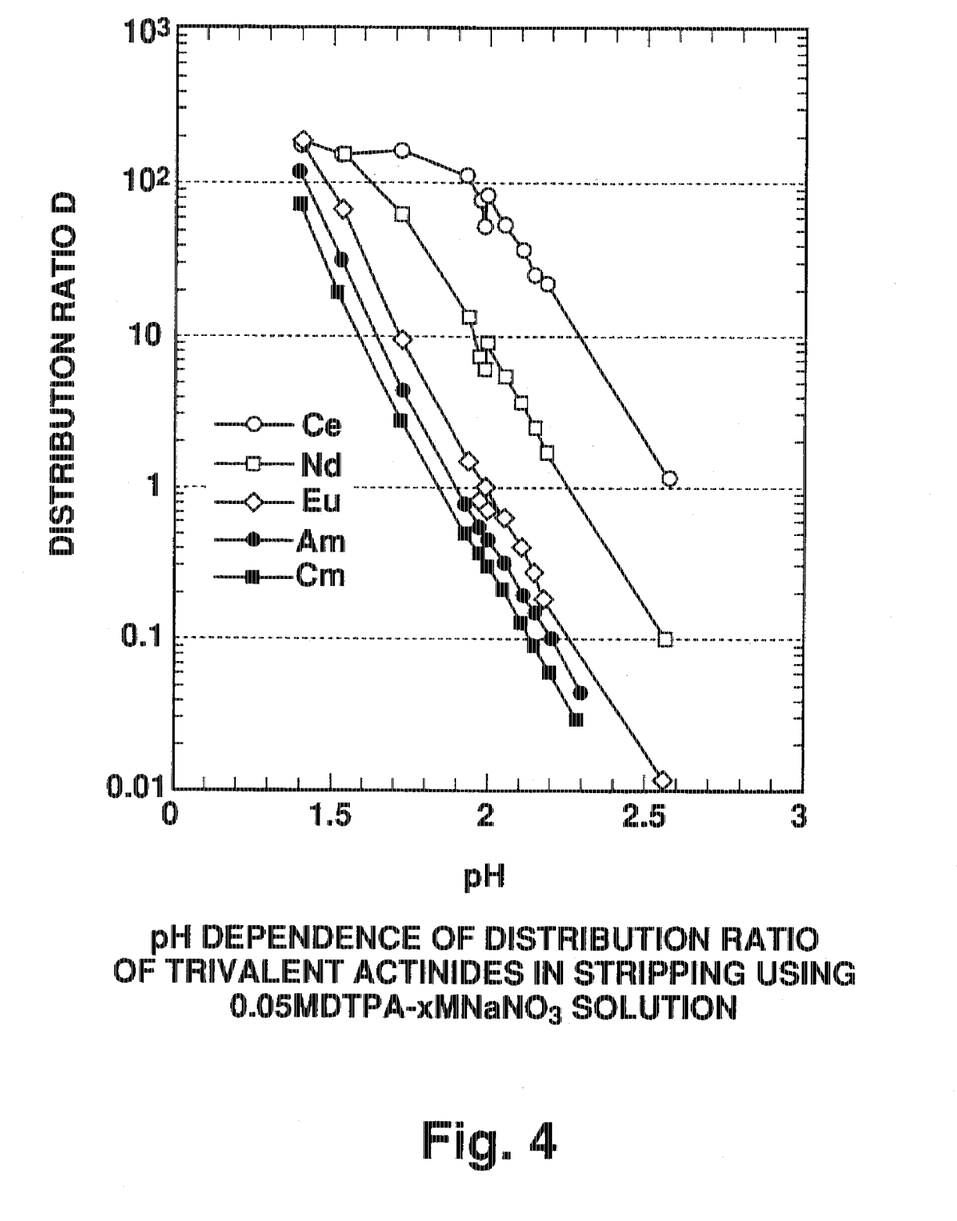
FIG. 4 is a diagram showing pH dependence of the distribution ratio of trivalent actinides and rare earth elements in the stripping of trivalent actinides.
Figure 5:
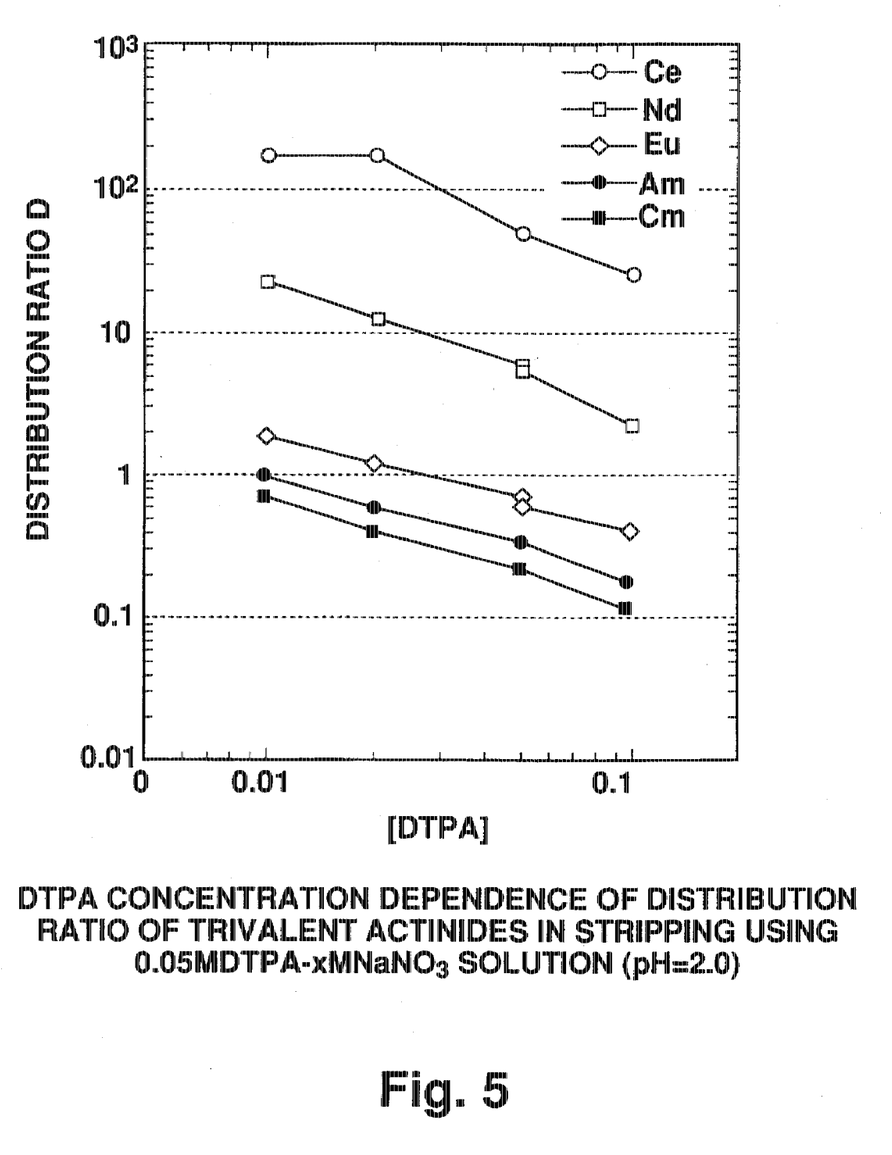
FIG. 5 is a diagram showing dependence of the distribution ratio of trivalent actinides and rare earth elements in the stripping of trivalent actinides, on the concentration of the complexing agent DTPA.

FIG. 3–FIG. 5 shows the respective distribution ratios of rare earth elements and trivalent actinides in the process for separating rare earth elements and trivalent actinides which is the third step. FIG. 3, in particular, shows the dependence of the distribution ratios of trivalent actinides and rare earth elements on sodium nitrate concentration. FIG. 4 shows the pH dependence of the distribution ratios of trivalent actinides and rare earth elements. FIG. 5 shows the dependence of the distribution ratios of trivalent actinides and rare earth elements on the concentration of the complexing agent DTPA.

In this step, rare earth elements remain in the organic phase whereas trivalent actinides are extracted into the aqueous phase. In FIG. 3–FIG. 5, therefore, the higher the distribution ratio D of rare earth elements, the more rare earth elements are selectively extracted by the organic layer. Conversely, the lower the distribution ratio D of trivalent actinides, the more trivalent actinides selectively shift to the aqueous phase. It is thus seen from FIG. 3–FIG. 5 that a good separation from trivalent actinides is achieved when the distribution ratio D of trivalent actinides is 1 or less and the distribution ratio of rare earth elements is 1 or more.

Advantages of the Invention

As stated hereinabove, a good separation of rare earth elements and trivalent actinides is achieved by the trivalent actinide/rare earth element separation method according to this invention. Further according to the method of this invention, the separation process is performed at a lower pH than in the TALSPEAK method of the prior art, so process control is easy. Finally, as the pH of the trivalent actinide product is approximately 2, product handling is far easier than in the conventional case.

What is claimed:

1. A method of separating trivalent actinides and rare earth elements comprising the following steps:
   extracting trivalent actinides and rare earth elements from a highly acidic waste generated by reprocessing of spent nuclear fuel, by a solvent,
   reducing the nitric acid concentration in said solvent used to extract said trivalent actinides and said rare earth elements, and
   separating said trivalent actinides and said rare earth elements contained in said solvent having a low nitric acid concentration from each other.

2. A method of separating trivalent actinides and rare earth elements as defined in claim 1 wherein, in said trivalent actinide/rare earth extraction step, said trivalent actinides and rare earth elements are extracted using a solvent comprising a mixture of octyl (phenyl)-N,N-diisobutylcarbamoylmethyl phosphine oxide of 0.2M concentration, tributylphosphoric acid (TBP) of 1.0–1.4M concentration, and a hydrocarbon diluent.

3. A method of separating trivalent actinides and rare earth elements as defined in claim 1 wherein, in said nitric acid removal step, a predetermined amount of nitric acid is removed from said solvent while maintaining said trivalent actinides and said rare earth elements in said solvent by bringing said solvent used to extract said trivalent actinides and rare earth elements in contact with an aqueous solution of nitric acid having a concentration of 0.1M or less and containing 0.2–1.0M of a nitrate, in order to reduce the nitric acid concentration of said solvent to 0.01M or less.

4. A method of separating trivalent actinides and rare earth elements as defined in claim 3, wherein, in said rare earth element/trivalent actinide separation step, an aqueous solution comprising nitrates having a concentration of 1–5M and a complexing agent having a concentration of 0.01–0.1M, is brought in contact with said solvent containing said trivalent actinides and said rare earth elements, the nitric acid concentration of said solvent having been reduced to 0.01M or less.

5. A method of separating trivalent actinides and rare earth elements as defined in claim 1 wherein the pH of the treated solvent in said rare earth element/trivalent actinide separation step lies in the range of 1.5–3.

6. A method of separating trivalent actinides and rare earth elements as defined in claim 4 wherein said nitrates used in said nitric acid removal step and said rare earth element/trivalent actinide separation step comprise one or more metal nitrates chosen from a group comprising alkali metal nitrates and alkaline earth metal nitrates, or hydroxylammonium nitrate.

7. A method of separating trivalent actinides and rare earth elements as defined in claim 1, wherein the pH of the treated solvent in said rare earth element/trivalent actinide separation step lies in the range of 1.8–2.2.

8. A method of separating trivalent actinides and rare earth elements as defined in claim 4, wherein said complexing agent used in said rare earth element/trivalent actinide separation step is an aminopolyacetic acid.

9. A method of separating trivalent actinides and rare earth elements as defined in claim 4, wherein said complexing agent used in said rare earth element/trivalent actinide separation step is at least one substance selected from the group consisting of diethylenetriamine pentacetic acid, ethylenediamine tetracetic acid and nitrilotriacetic acid.

10. A method of separating trivalent actinides and rare earth elements as defined in claim 4, wherein the process temperature in said rare earth element/trivalent actinide separation step lies within a range from 25° C. to 40° C.

11. A method of separating trivalent actinides and rare earth elements as defined in claim 1, further comprising stripping rare earth elements alone using dilute nitric acid from the solvent containing said rare earth elements which have been separated from said trivalent actinides.

* * * * *